United States Patent
Fujikawa et al.

(10) Patent No.: US 11,623,276 B2
(45) Date of Patent: Apr. 11, 2023

(54) METHOD FOR MANUFACTURING MAGNET AND METHOD FOR MAGNETIZING MAGNET

(71) Applicant: NITTO DENKO CORPORATION, Ibaraki (JP)

(72) Inventors: Kenichi Fujikawa, Ibaraki (JP); Shoichiro Saito, Ibaraki (JP); Katsuya Kume, Ibaraki (JP); Takashi Yamamoto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 513 days.

(21) Appl. No.: 16/616,653

(22) PCT Filed: May 25, 2018

(86) PCT No.: PCT/JP2018/020193
§ 371 (c)(1),
(2) Date: Nov. 25, 2019

(87) PCT Pub. No.: WO2018/216805
PCT Pub. Date: Nov. 29, 2018

(65) Prior Publication Data
US 2020/0282463 A1 Sep. 10, 2020

(30) Foreign Application Priority Data
May 26, 2017 (JP) .................................. 2017-104929

(51) Int. Cl.
*H01F 7/06* (2006.01)
*B22F 3/24* (2006.01)
(Continued)

(52) U.S. Cl.
CPC .............. *B22F 3/24* (2013.01); *H01F 13/003* (2013.01); *H01F 41/0253* (2013.01); *H01F 41/0273* (2013.01); *B22F 2202/05* (2013.01)

(58) Field of Classification Search
CPC ............... H01F 7/0205; H01F 41/0253; H01F 41/0273; H01F 13/003; H02K 15/03; B22F 3/24; B22F 2202/05
See application file for complete search history.

(56) References Cited

U.S. PATENT DOCUMENTS

| 4,536,230 A | 8/1985 | Landa et al. |
| 5,049,053 A | 9/1991 | Tabaru |

(Continued)

FOREIGN PATENT DOCUMENTS

| CN | 1199232 A | 11/1998 |
| CN | 104335455 A | 2/2015 |

(Continued)

OTHER PUBLICATIONS

Extended European Search Report issued for corresponding European Patent Application No. 18805587.5 dated Jan. 21, 2021.
(Continued)

*Primary Examiner* — Paul D Kim
(74) *Attorney, Agent, or Firm* — Hauptman Ham, LLP

(57) ABSTRACT

A method for manufacturing a magnet includes (1) a step of preparing three or more unmagnetized magnet materials of which magnetization easy axes are oriented in predetermined directions, and adhering the unmagnetized magnet materials with each other to make an assembly, and (2) a step of applying a curved pulse magnetic field to the assembly to magnetize the assembly, wherein in the step (2), the unmagnetized magnet materials are magnetized into magnet blocks, and an angle θ (where 0≤θ≤180 degrees holds) formed by magnetization directions of at least a pair of
(Continued)

magnet blocks adjacent to each other is in a range of 30 degrees to 120 degrees.

8 Claims, 8 Drawing Sheets

(51) Int. Cl.
*H01F 13/00* (2006.01)
*H01F 41/02* (2006.01)

(56) References Cited

U.S. PATENT DOCUMENTS

| | | | |
|---|---|---|---|
| 5,338,372 A | | 8/1994 | Tabaru |
| 5,714,850 A | * | 2/1998 | Kitamura ................ H05H 7/04 315/5.35 |
| 6,057,656 A | | 5/2000 | Ohashi et al. |
| 10,321,552 B2 | * | 6/2019 | Kinjo ..................... H01F 7/06 |
| 10,624,200 B2 | * | 4/2020 | Qiao ..................... G21K 1/003 |
| 2016/0070181 A1 | | 3/2016 | Frissen et al. |

FOREIGN PATENT DOCUMENTS

| | | |
|---|---|---|
| CN | 105280324 A | 1/2016 |
| EP | 0 877 397 A2 | 11/1998 |
| EP | 2 999 996 A1 | 3/2016 |
| JP | H2-290003 A | 11/1990 |
| JP | H6-302417 A | 10/1994 |
| JP | H10-289800 A | 10/1998 |
| JP | 2004-72820 A | 3/2004 |
| JP | 2010-50440 A | 3/2010 |
| JP | 2010-130818 A | 6/2010 |
| JP | 2013-243886 A | 12/2013 |
| JP | 2016-29880 A | 3/2016 |
| JP | 2016-72457 A | 5/2016 |
| KR | 10-0487082 B1 | 8/2005 |
| WO | 2014/187792 A1 | 11/2014 |

OTHER PUBLICATIONS

First Office Action issued for corresponding Chinese Patent Application No. 201880034468.9 dated Jan. 13, 2021, along with an English machine translation.
International Search Report for corresponding international application PCT/JP2018/020193 dated Aug. 7, 2018.
Office Action dated Sep. 26, 2021, for corresponding Chinese patent application No. 201880034468.9, along with an English translation.
Office Action dated Mar. 1, 2022 for corresponding Japanese Patent Application No. 2018-100231, along with an English machine translation.
Office Action dated May 11, 2022 for corresponding Korean Patent Application No. 10-2019-7034562, along with an English machine translation (11 pages).
Office Action dated Nov. 1, 2022 for corresponding Japanese Patent Application No. 2018-100231, along with an English translation (6 pages).

* cited by examiner

METHOD FOR MANUFACTURING MAGNET AND METHOD FOR MAGNETIZING MAGNET

This application claims the priority of Japanese Patent Application No. 2017-104929, filed on May 26, 2017 in the JPO (Japanese Patent Office). Further, this application is the National Phase Application of International Application No. PCT/JP2018/020193, filed on May 25, 2018, which designates the United States and was published in Japan. Both of the priority documents are hereby incorporated by reference in their entireties.

TECHNICAL FIELD

The present invention relates to a method for manufacturing a magnet and a method for magnetizing a magnet.

BACKGROUND ART

In machine tools, vehicles, aircraft, wind power generators, and the like, a generator is used to convert mechanical kinetic energy transmitted from an engine and the like into electrical energy, and a motor that conversely converts electrical energy into mechanical kinetic energy and the like is used.

In recent years, so-called Halbach magnets have been proposed with respect to permanent magnets used for such motors and the like in order to further improve the magnetic characteristics.

A Halbach magnet is a magnet made by combining a plurality of permanent magnet blocks in an array called a Halbach array. In the Halbach magnet, the magnetic field strength in a specific direction can be improved by optimizing the directions of the magnetic poles of the permanent magnet blocks.

CITATION LIST

Patent Document

Patent Document 1: Japanese Laid-Open Patent Publication No. 2016-029880

SUMMARY OF THE INVENTION

Problems to be Solved by the Invention

However, in order to make a Halbach magnet, it is necessary to bond a plurality of permanent magnet blocks in a state where the permanent magnets are repelled and/or attracted to each other. For this reason, the conventional methods for manufacturing Halbach magnets are low in productivity and have a problem in that it is difficult to mass produce the Halbach magnets. Moreover, in the conventional manufacturing methods, the precision of assembly tends to be deteriorated due to the influence of the above-described repulsions and/or attractions, and there is a possibility that desired characteristics cannot be obtained in the resulting Halbach magnet.

As a method for dealing with this problem, it is conceivable to, instead of using pre-magnetized permanent magnet blocks, form an assembly by arraying unmagnetized magnet blocks and magnetize the assembly later.

However, according to Patent Document 1, it is reported that in such a method, for example, magnetization cannot be performed in a manner in which the magnetization directions differ by 90 degrees between adjacent unmagnetized magnet blocks (Patent Document 1). This is because, since the magnetic field usually has continuity, it is impossible in principle to apply a magnetic field along the orientation directions of the magnetization easy axes to adjacently arranged unmagnetized magnet blocks having different orientation directions of magnetization easy axes.

As explained above, the conventional method has a problem that it is difficult to manufacture a Halbach magnet with a high productivity.

The present invention has been made in view of such a background, and it is an object of the present invention to provide a method for manufacturing a Halbach magnet with a higher productivity than the conventional method and a method for magnetizing an unmagnetized magnet with a higher productivity than a conventional method.

Means for Solving the Problems

The present invention provides a method for manufacturing a magnet, including:

(1) a step of preparing three or more unmagnetized magnet materials of which magnetization easy axes are oriented in predetermined directions, and adhering the unmagnetized magnet materials with each other to make an assembly; and (2) a step of applying a curved pulse magnetic field to the assembly to magnetize the assembly, wherein in the step (2), the unmagnetized magnet materials are magnetized into magnet blocks, and an angle $\theta$ (where $0 \leq \theta \leq 180$ degrees holds) formed by magnetization directions of at least a pair of magnet blocks adjacent to each other is in a range of 30 degrees to 120 degrees.

The present invention also provides a magnetizing method comprising:

(1) a step of preparing three or more unmagnetized magnet materials of which magnetization easy axes are oriented in predetermined directions, and adhering the unmagnetized magnet materials with each other to make an assembly; and (2) a step of applying a curved pulse magnetic field to the assembly to magnetize the assembly, wherein in the step (2), the unmagnetized magnet materials are magnetized into magnet blocks, and an angle $\theta$ (where $0 \leq \theta \leq 180$ degrees holds) formed by magnetization directions of at least a pair of magnet blocks adjacent to each other is in a range of 30 degrees to 120 degrees.

Effect of the Invention

The present invention can provide a method for manufacturing a Halbach magnet with a higher productivity than the conventional method and a method for magnetizing an unmagnetized magnet with a higher productivity than a conventional method.

MODES FOR CARRYING OUT THE INVENTION

Hereinafter, an embodiment of the present invention will be described with reference to the drawings.

(A Method for Manufacturing a Halbach Magnet According to an Embodiment of the Present Invention)

An example of a method for manufacturing a Halbach magnet according to an embodiment of the present invention will be described with reference to FIG. 1 to FIG. 9.

Figure 1:
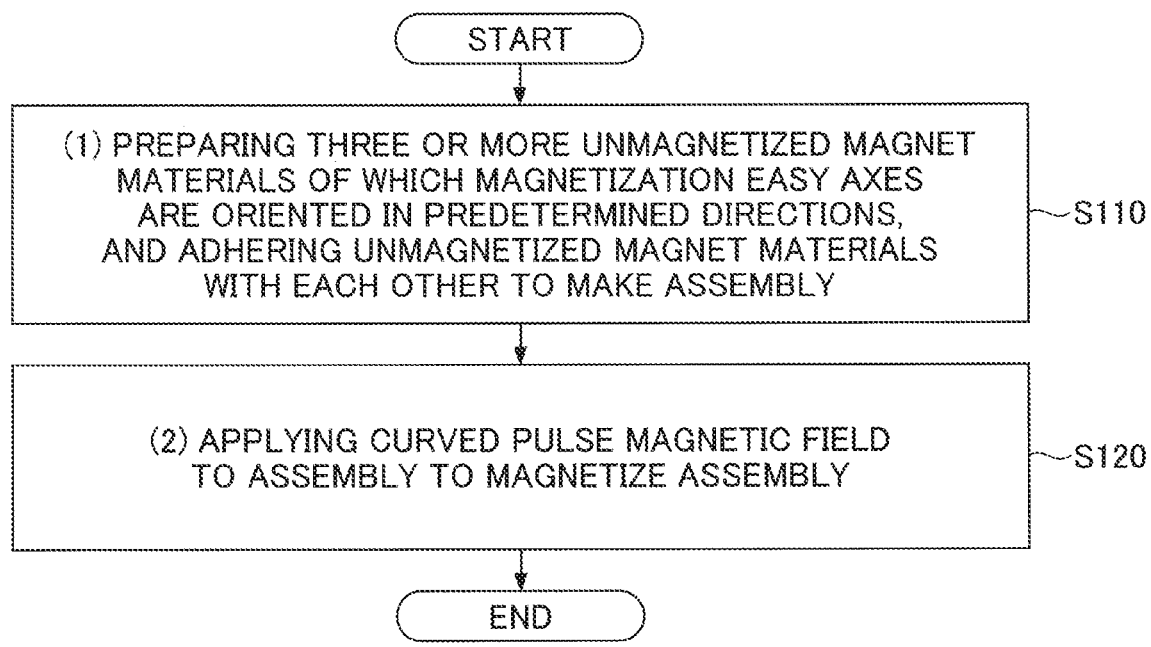
FIG. 1 is a drawing schematically illustrating an example of a flow of a method for manufacturing a Halbach magnet according to an embodiment of the present invention.

FIG. 1 schematically illustrates a flow of a method for manufacturing a Halbach magnet (hereinafter referred to as "first manufacturing method") according to an embodiment of the present invention.

As illustrated in FIG. 1, the first manufacturing method includes:

(1) a step (step S110) of preparing three or more unmagnetized magnet materials of which magnetization easy axes are oriented in predetermined directions, and adhering the unmagnetized magnet materials with each other to make an assembly; and (2) a step (step S120) of applying a curved pulse magnetic field to the assembly to magnetize the assembly.

The "curved (pulse) magnetic field" in step S120 means a (pulse) magnetic field in which the directions of the magnetic field lines passing through the interior of the assembly (magnetization target body) are not straight lines but curved lines.

An example of an unmagnetized magnet material in which the magnetization easy axis is oriented in a predetermined direction includes a parallel oriented unmagnetized magnet material in which the magnetization easy axes are aligned in a single direction. Here, the term "parallel oriented" means, for example, an orientation in which a difference in the orientation directions of the magnetization easy axes at three points which equally divide into four a diagonal line on a face yielding the maximum surface magnetic flux density, when the unmagnetized magnet material is magnetized, is within 15 degrees.

Hereinafter, each of the steps will be explained.

(Step S110)

First, three or more unmagnetized magnet materials are prepared.

Figure 2:
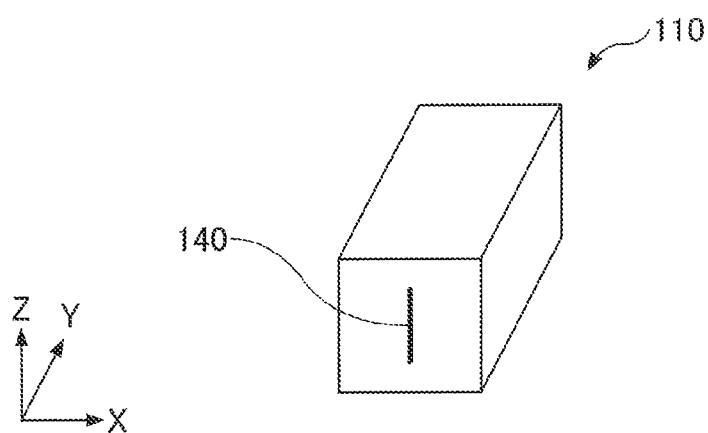
FIG. 2 is a perspective view schematically illustrating a form of an unmagnetized magnet material.

FIG. 2 is a perspective view schematically illustrating a form of an unmagnetized magnet material.

As illustrated in FIG. 2, this unmagnetized magnet material 110 has a substantially rectangular parallelepiped shape. In the unmagnetized magnet material 110, a magnetization easy axis 140 of the magnetic particles is oriented in a predetermined direction. For example, in the example illustrated in FIG. 2, in the unmagnetized magnet material 110, the magnetization easy axis 140 is oriented in the vertical direction (Z direction of FIG. 2).

However, this is merely an example, and the orientation direction of the magnetization easy axis of the unmagnetized magnet material is determined based on a Halbach array of a Halbach magnet to be manufactured later. For example, the magnetization easy axis 140 of the unmagnetized magnet material 110 may be oriented in a direction parallel to the Z axis in FIG. 2, or may be at a predetermined angle (for example, 30 degrees, 45 degrees, or 90 degrees) with respect to the Z axis.

In a case where the unmagnetized magnet material 110 is substantially a cuboid, the length of the shortest side of the unmagnetized magnet material 110 is, for example, in a range of 1 mm to 6 mm. The length of the shortest side is preferably in a range of 2 mm to 4 mm. On the other hand, the length of the longest side of the unmagnetized magnet material 110 is, for example, in a range of 5 mm to 50 mm.

The unmagnetized magnet material 110 may be, for example, a rare earth sintered magnet in an unmagnetized state. The rare earth sintered magnet may be a neodymium-iron-boron alloy.

Since the manufacturing method of the unmagnetized magnet material 110 is known to those skilled in the art, further explanation is omitted here.

Next, multiple unmagnetized magnet materials are adhered with each other to form an assembly.

Figure 3:
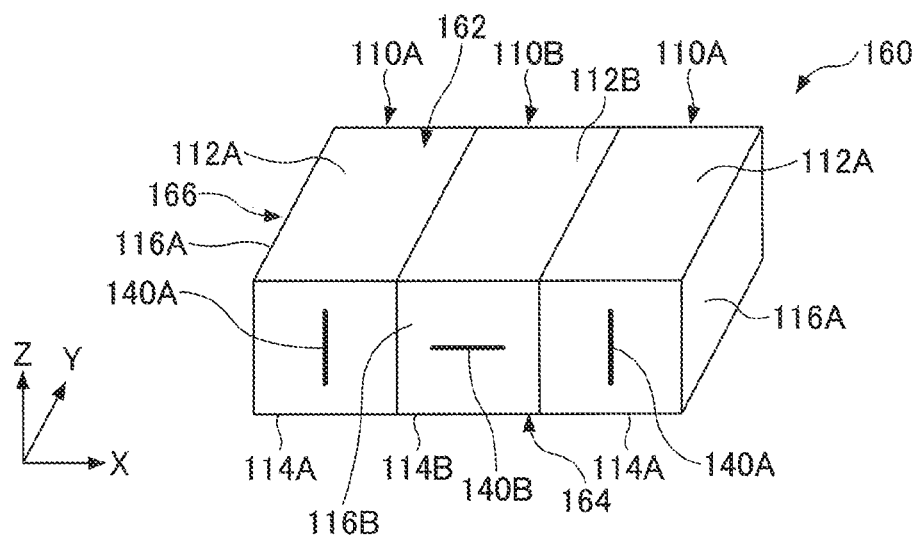
FIG. 3 is a perspective view schematically illustrating a configuration example of an assembly according to an embodiment of the present invention.

FIG. 3 schematically illustrates a configuration example of the assembly.

As illustrated in FIG. 3, the assembly 160 has a substantially cuboid shape, and includes an upper face 162, a bottom face 164, and four side faces 166.

The assembly 160 is made by arraying three materials, i.e., a first unmagnetized magnet material 110A, a second unmagnetized magnet material 110B, and a first unmagnetized magnet material 110A, into a row in this order. Hereinafter, the direction in which the unmagnetized magnet materials are arrayed (direction X in FIG. 3) will also be referred to as an "array direction (of an unmagnetized magnet material)".

Although not illustrated in FIG. 3 for the sake of clarity, an adhesive is actually interposed between the first unmagnetized magnet material 110A and the second unmagnetized magnet material 110B adjacent to each other. The first unmagnetized magnet material 110A and the second unmagnetized magnet material 110B are bonded to each other via this adhesive.

The first unmagnetized magnet material 110A includes a first upper face 112A, a first bottom face 114A, and four first side faces 116A. It should be noted that, among six faces of the first unmagnetized magnet material 110A, a face that is bonded with the second unmagnetized magnet material 110B is especially referred to as a "first bonding target face".

The second unmagnetized magnet material 110B includes a second upper face 112B, a second bottom face 114B, and four second side faces 116B. It should be noted that, among six faces of the second unmagnetized magnet material 110B, a face that is bonded with the first unmagnetized magnet material 110A is especially referred to as a "second bonding target face".

According to this denotation, the unmagnetized magnet materials 110A, 110B are arrayed in such a manner that the first bonding target face (one of the first side faces 116A) of the first unmagnetized magnet material 110A and the second bonding target face (one of the second side faces 116B) of the second unmagnetized magnet material 110B face each other, and the assembly 160 is made by repeating this process.

The upper face 162 of the assembly 160 is formed by the first upper faces 112A of two first unmagnetized magnet materials 110A and the second upper face 112B of one second unmagnetized magnet material 110B. Likewise, the bottom face 164 of the assembly 160 is formed by the first bottom faces 114A of two first unmagnetized magnet materials 110A and the second bottom face 114B of one second unmagnetized magnet material 110B.

Here, in a case where the upper face 162 and the bottom face 164 face each other like the assembly 160, the distance between the upper face 162 and the bottom face 164 will be referred to as "thickness". In the example illustrated in FIG. 3, the direction of the thickness of the assembly 160 is parallel to the Z direction.

The thickness of the assembly 160 is in a range of 1 mm to 10 mm, more preferably in a range of 1 mm to 6 mm, and still more preferably in a range of 1.5 mm or more and less than 6 mm.

On the other hand, the length along the array direction of the assembly 160 (hereinafter referred to as "array length") is preferably in a range of 10 mm to 40 mm.

In the normal case, the size in the Z direction of the first unmagnetized magnet material 110A is configured to be equal to the size in the Z direction of the second unmagnetized magnet material 110B. Accordingly, the thickness of the assembly 160 can be uniform, and the polishing step for uniformizing the thickness of the Halbach magnet manufactured later can be omitted or simplified.

Referring to FIG. 3 again, the first unmagnetized magnet materials 110A are arranged in the assembly 160 such that magnetization easy axes 140A are parallel to the thickness direction of the assembly 160. The second unmagnetized magnet material 110B is arranged in the assembly 160 such that the magnetization easy axis 140B is parallel to the array direction of the unmagnetized magnet materials 110A and 110B.

As a result, in the adjacent unmagnetized magnet materials 110A and 110B in the assembly 160, the angle α between the magnetization easy axis 140A and the magnetization easy axis 140B (hereinafter referred to as "magnetization easy axis angle difference α") is 90 degrees (where 0 degrees ≤α≤90 degrees is assumed to hold).

Actually, in the unmagnetized magnet material, the angle of the magnetization easy axis includes a variation of about ±5 degrees. Accordingly, in this application, the value of the angle difference α of magnetization easy axis is assumed to include a range of ±5 degrees. Therefore, when the angle difference α of the magnetization easy axis is 90 degrees, it means that a is 85 degrees to 95 degrees. The direction of the magnetization easy axis of the unmagnetized magnet material can be measured by electron backscatter diffraction. In other words, in a pole figure of the magnetization easy axes obtained by electron backscatter diffraction, the most frequent direction can be adopted as the direction of the magnetization easy axis at the analysis point in question. As the analysis points, analysis may be performed at three points which equally divide into four a diagonal line on a face yielding the maximum surface magnetic flux density, when the unmagnetized magnet material is magnetized, and the average value of the directions of the magnetization easy axes at these three points may be adopted as the orientation direction of the unmagnetized magnet material, i.e., the direction 140 of the magnetization easy axis.

Further, in the example illustrated in FIG. 3, the assembly 160 is made by bonding a total of three unmagnetized magnet materials 110A and 110B in an array direction. However, it should be noted that this form is merely an example. That is, in the assembly, the total number of unmagnetized magnet materials to be bonded is not particularly limited as long as it is 3 or more.

Also, in the assembly, the orientation directions of the magnetization easy axes of unmagnetized magnet materials to be used do not necessarily have to be the same as the directions of the magnetization easy axes 140A and 140B illustrated in FIG. 3.

Hereinafter, another configuration of an assembly will be described with reference to FIG. 4 to FIG. 6.

Figure 4:
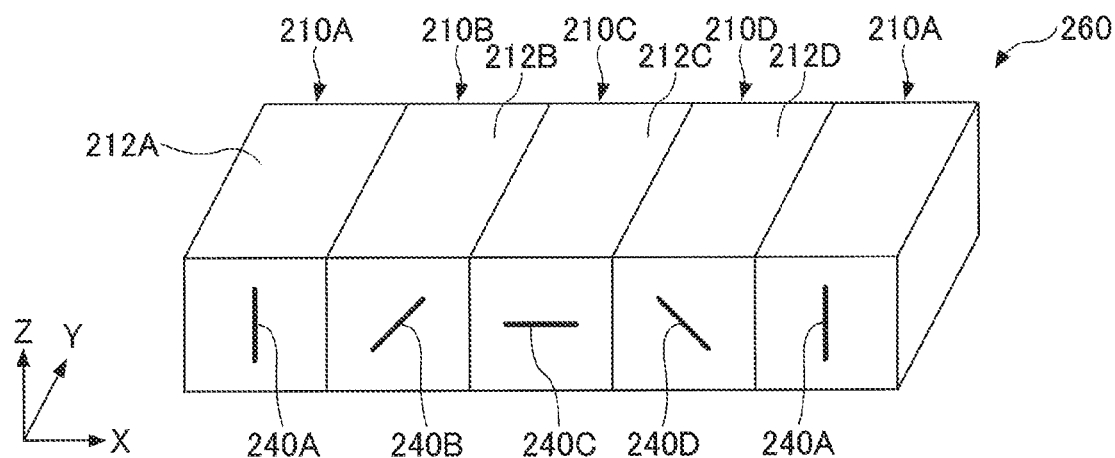
FIG. 4 is a perspective view schematically illustrating a configuration example of another assembly according to an embodiment of the present invention.
Figure 5:
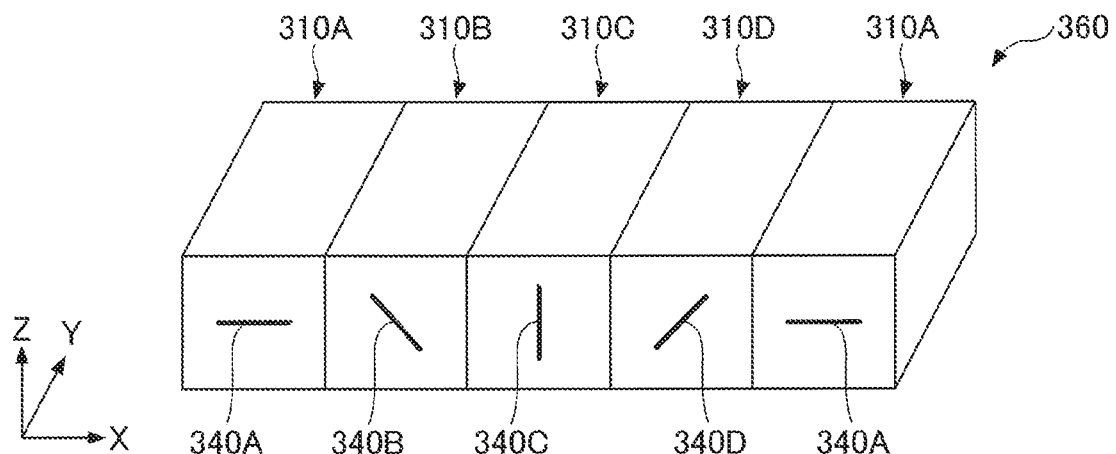
FIG. 5 is a perspective view schematically illustrating a configuration example of still another assembly according to an embodiment of the present invention.
Figure 6:
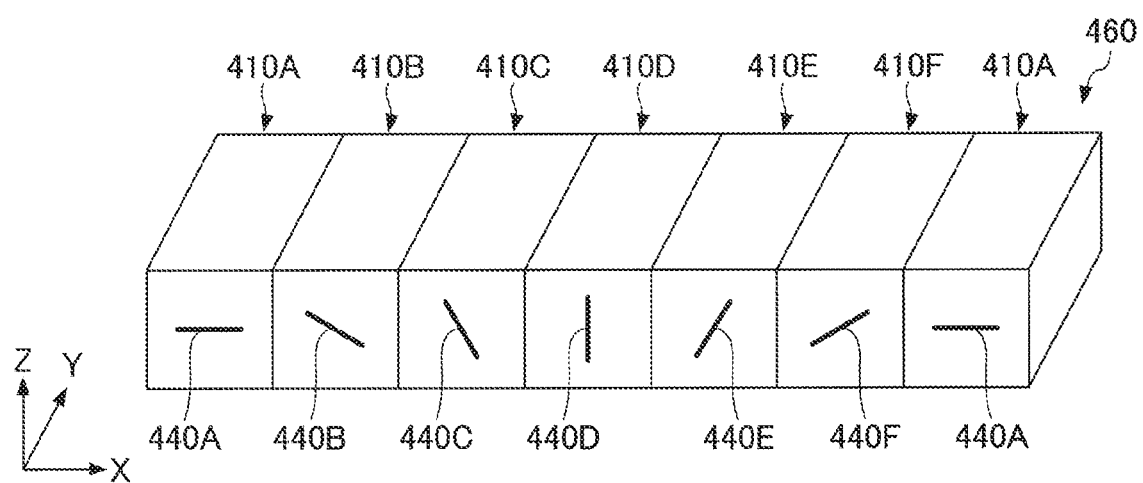
FIG. 6 is a perspective view schematically illustrating a configuration example of still another assembly according to an embodiment of the present invention.

FIG. 4 to FIG. 6 schematically illustrate another aspect of an assembly.

In the example illustrated in FIG. 4, an assembly 260 is made by arranging a total of five unmagnetized magnet materials 210A, 210B, 210C, 210D, and 210A along the array direction (X direction). In the assembly 260, the same unmagnetized magnet material 210A may be disposed at the left and right ends as illustrated in FIG. 4.

The unmagnetized magnet materials 210A to 210D have magnetization easy axes 240A to 240D oriented in different directions.

As a result, in the configuration of this assembly 260, the angle difference α of the magnetization easy axes 240 is 45 degrees in any one of the pairs of adjacent unmagnetized magnet materials.

In the example illustrated in FIG. 5, an assembly 360 is made by arranging a total of five unmagnetized magnet materials 310A, 310B, 310C, 310D, and 310A along the array direction (X direction). In the assembly 360, the same unmagnetized magnet material 310A may be disposed at the left and right ends as illustrated in FIG. 5.

The unmagnetized magnet materials 310A to 310D have magnetization easy axes 340A to 340D oriented in directions different from each other.

Here, like the assembly 260 illustrated in FIG. 4, in the assembly 360, the angle difference α among the magnetization easy axes 340A to 340D is 45 degrees in any one of the pairs of adjacent unmagnetized magnet materials. However, the assembly 360 differs from the assembly 260 in that the assembly 360 has, at the left and right ends, unmagnetized magnet materials 310A in which the magnetization easy axis 340 is oriented in the direction parallel to the array direction.

Furthermore, in the example illustrated in FIG. 6, an assembly 460 is made by arranging a total of seven unmagnetized magnet materials 410A, 410B, 410C, 410D, 410E, 410F, and 410A arranged along the array direction (X direction). In the assembly 460, as illustrated in FIG. 6, the same unmagnetized magnet materials 410A may be disposed at the left and right ends.

The unmagnetized magnet materials 410A to 410F have magnetization easy axes 440A to 440F oriented in directions different from each other.

As a result, in the configuration of this assembly 460, the angle difference α of the magnetization easy axis 440 is 30 degrees in each of the pairs of adjacent unmagnetized magnet materials.

As explained above, in the assemblies, the angle difference α of the magnetization easy axes in adjacent pairs of unmagnetized magnet materials is not particularly limited as long as it is in the range of 30 degrees to 120 degrees. Similarly, it should be noted that the number of unmagnetized magnet materials included in the assembly is not particularly limited as long as it is 3 or more.

(Step S120)

Next, the assembly made in the aforementioned steps is magnetized.

Figure 7:
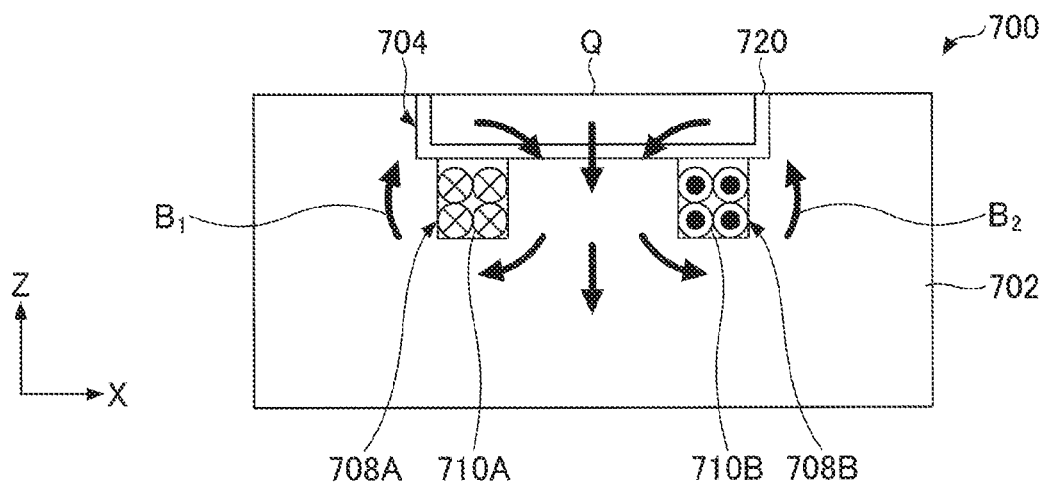
FIG. 7 is a cross-sectional view schematically illustrating a configuration example of a magnetization apparatus that can be used for magnetization process of an assembly.

FIG. 7 schematically illustrates a cross section of a magnetization apparatus that can be used for magnetization process of an assembly.

As illustrated in FIG. 7, the magnetization apparatus 700 has a housing 702. The housing 702 has an accommodation part 704. A magnetization target body Q, i.e., an assembly holding case 720 including an assembly, is placed in the accommodation part 704.

The housing 702 includes two coil accommodation spaces 708A and 708B formed in parallel to a top view, i.e., the Y direction (i.e., a direction perpendicular to the page of this application) of FIG. 7.

Coils 710A and 710B are accommodated in the coil accommodation spaces 708A and 708B, respectively. The coil accommodation spaces 708A and 708B are filled with nonmagnetic resin.

In a case where the assembly is magnetized using the magnetization apparatus 700, an assembly holding case 720 is arranged in the accommodation part 704 of the housing 702. In the assembly holding case 720, a magnetization target body Q is placed. The magnetization target body Q may be, for example, the assembly 360 illustrated in FIG. 5 explained above.

It should be noted that the magnetization target body Q does not necessarily need to be used by being accommodated in the assembly holding case 720. For example, the magnetization target body Q may be directly accommodated in the accommodation part 704 of the housing 702.

Next, in this state, a current is supplied to the coils 710A and 710B in the housing 702.

Here, as illustrated in FIG. 7, it is assumed that a current flows through the coil 710A from the front side to the back side of the page of this application, and a current flows through the coil 710B from the back side to the front side of the page of this application. The housing 702 is made of a magnetic material and functions as a yoke.

With the applied current, an annular magnetic field $B_1$ is generated from the coil 710A. As illustrated in FIG. 7, the annular magnetic field $B_1$ is generated substantially in a clockwise direction around the coil 710A. Likewise, with the applied current, the annular magnetic field $B_2$ is generated from the coil 710B. As illustrated in FIG. 7, the annular magnetic field $B_2$ is generated substantially in a counter-clockwise direction around the coil 710B.

Here, the coil 710A and the coil 710B are energized by charging a capacitor connected to the coil 710A and the coil 710B and discharging the electric charge charged in the capacitor. In this case, the annular magnetic field $B_1$ and the annular magnetic field $B_2$ are pulse magnetic fields generated by the pulse current.

In such methods, strong annular magnetic fields $B_1$ and $B_2$ can be stably generated from the coil 710A and the coil 710B without damaging the coil 710A and the coil 710B.

The pulse width of the pulse current is, for example, in the range of 0.3 ms to 100 ms, preferably 0.5 ms to 10 ms. By setting the pulse width to the above range, a strong magnetic field can be applied while the heat generation of the coils is suppressed. The maximum current is, for example, in the range of 8 kA to 20 kA. It should be noted that the pulse current may be applied to the coil 710A and the coil 710B a plurality of times.

A pulse magnetic field is applied to the magnetization target body Q by these annular magnetic fields $B_1$ and $B_2$. As a result, the unmagnetized magnet materials contained in the magnetization target body Q are magnetized, and thus a magnetized body is obtained.

Figure 8:
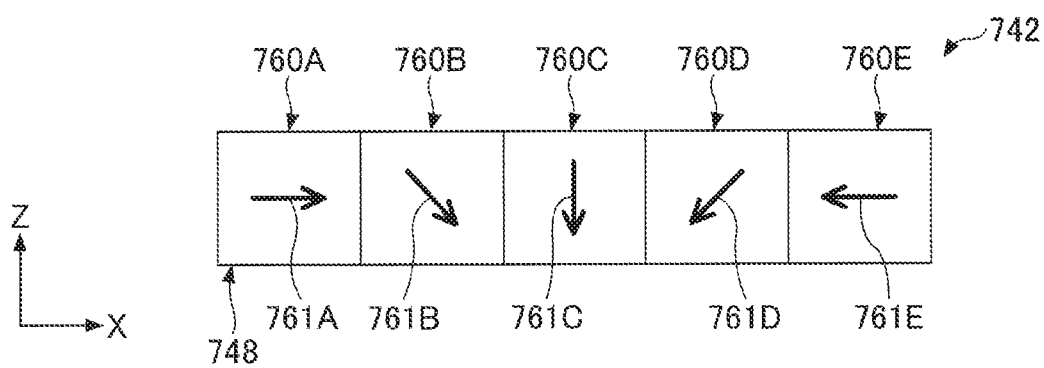
FIG. 8 is a drawing schematically illustrating an example of magnetization directions of a magnetized body obtained through magnetizing process using the magnetization apparatus illustrated in FIG. 7.

For example, in a case where the magnetization process is performed on the assembly 360 as illustrated in FIG. 5, the unmagnetized magnet materials 310A to 310D are magnetized in the magnetizing directions as illustrated in FIG. 8.

Here, as illustrated in FIG. 8, in a magnetized body 742, the magnetized magnets will be referred to as a magnet block 760A, a magnet block 760B, a magnet block 760C, a magnet block 760D, and a magnet block 760E, in an order along the X direction. The magnetization directions of the magnet blocks 760A to 760E will be referred to as 761A to 761E.

In the magnetized body 742, the angle θ formed by the magnetizing directions of adjacent magnet block pairs is defined as a magnetization direction angle difference θ (where θ is in a range of 0 degrees to 180 degrees). In the example illustrated in FIG. 8, the magnetization direction angle difference θ is 45 degrees in any pair.

Actually, the magnetization direction of the magnet block includes a variation of about ±5 degrees. Therefore, in this application, the value of the magnetization direction angle difference θ is assumed to include the range of ±5 degrees. Therefore, the magnetization direction angle difference of 45 degrees means a range in which θ is 40 degrees to 50 degrees. The same applies to other values of magnetization direction angle differences. The direction of the magnetization is the direction having the N magnetic pole of the directions of the magnetization easy axis.

Here, FIG. 8 illustrates, for example, a case where the magnetization direction angle difference θ is 45 degrees in the magnetized body 742. However, this is merely an example, and in the magnetized body, the magnetization direction angle difference θ can be any given value selected from a range of 30 degrees to 120 degrees.

For example, in the magnetization apparatus 700 illustrated in FIG. 7, in a case where the distance between the two coil accommodation spaces 708A and 708B is brought to be closer, a magnetized body having a larger magnetization direction angle difference θ can be obtained.

Figure 9:
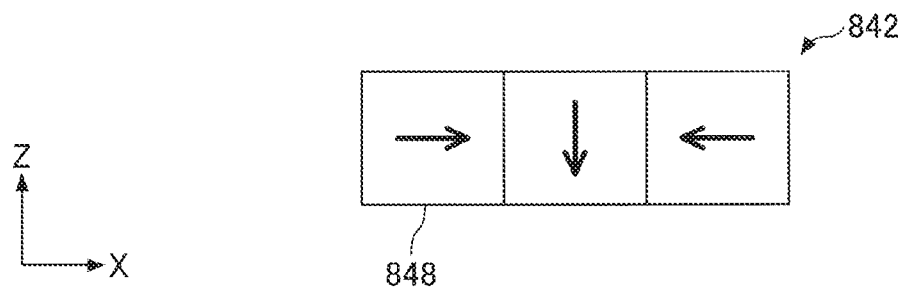
FIG. 9 is a drawing schematically illustrating a configuration example of a magnetized body of which magnetization direction angle difference θ is 90 degrees.

For example, in a case where magnetization process is performed using an assembly in which three unmagnetized magnet materials are arrayed so that the angle difference α of the magnetization easy axes is 90 degrees, a magnetized body 842 having a magnetization direction angle difference θ of 90 degrees can be obtained as illustrated in FIG. 9.

Through the above steps, a magnetized body 742, i.e., a Halbach magnet, can be manufactured. In the magnetized body 742 illustrated in FIG. 8, a bottom face 748 is a face yielding the maximum surface magnetic flux density (hereinafter referred to as "principal face (of Halbach magnet)"). Likewise, in the magnetized body 842 illustrated in FIG. 9, the bottom face 848 is a principal face.

The size in the direction perpendicular to the principal face, i.e., to the bottom face 748, of the magnetized body 742 (i.e., "thickness" of the magnetized body 742) is, for example, in a range of 1 mm to 10 mm, more preferably in a range of 1 mm to 6 mm, still more preferably in a range of 5 mm or more and less than 6 mm. By setting the thickness to 1.5 mm or more, the maximum value of the surface magnetic flux density on the principal face of the magnetized body 742 can be increased. By setting the thickness to less than 6 mm (more preferably 5 mm or less, still more preferably 4 mm or less), the magnetization rate of each of the magnet blocks constituting the magnetized body 742 can be increased (for example, 95% or more). By setting the magnetization rate to 95% or more, the squareness is improved, and this can make it less likely for the magnet block to demagnetize.

Here, as explained above, conventionally, it was thought to be difficult to perform magnetization in a manner in which the magnetization directions are greatly different in a pair of adjacent unmagnetized magnet blocks. This is because, since the magnetic field usually has continuity, it is impossible in principle to apply a magnetic field along the directions of the magnetization easy axes to the adjacently arranged unmagnetized magnet blocks having different orientation directions of magnetization easy axes.

In contrast, as explained above, the inventor and the like of the present application has discovered that, by using the magnetization apparatus 700 as illustrated in FIG. 7 to apply a pulse magnetic field to the magnetization target body Q, magnetization can be performed even in a manner in which the magnetization directions are greatly different in a pair of adjacent unmagnetized magnet materials. An example of manufacturing a Halbach magnet according to the method of performing the magnetization after the assembling has never been expected to date, and the result of the present application is surprising.

Thus, in the first manufacturing method, the Halbach magnet can be manufactured by performing the magnetization process on the magnetization target body Q later. In the first manufacturing method, it is not necessary to bond a plurality of permanent magnet blocks in a state where the permanent magnets are repelled and/or attracted to each other, like the conventional case. Therefore, with the first manufacturing method, a Halbach magnets can be manufactured with a significantly higher productivity than conventional methods.

In addition, the first manufacturing method can avoid the problem of deterioration in the precision of assembly due to the influence of the above-described repulsions and/or attractions of the magnet blocks, and can relatively easily manufacture a Halbach magnet having desired characteristics.

(Another Method for Manufacturing a Halbach Magnet According to Embodiment of the Present Invention)

Next, another method for manufacturing a Halbach magnet according to embodiment of the present invention (hereinafter referred to as a "second manufacturing method") will be explained.

The second manufacturing method includes:

(1) a step (step S210) of preparing three or more unmagnetized magnet materials of which magnetization easy axes are oriented in predetermined directions, and adhering the unmagnetized magnet materials with each other to make an assembly; and (2) a step (step S220) of applying an annular pulse magnetic field to the assembly to magnetize the assembly.

The second manufacturing method is fundamentally similar to the first manufacturing method explained above. However, in the second manufacturing method, a magnetization apparatus different from the magnetization apparatus 700 used in the first manufacturing method is used in step S220.

Therefore, the magnetization apparatus that can be used in step S220 of the second manufacturing method will be described below.

Figure 10:
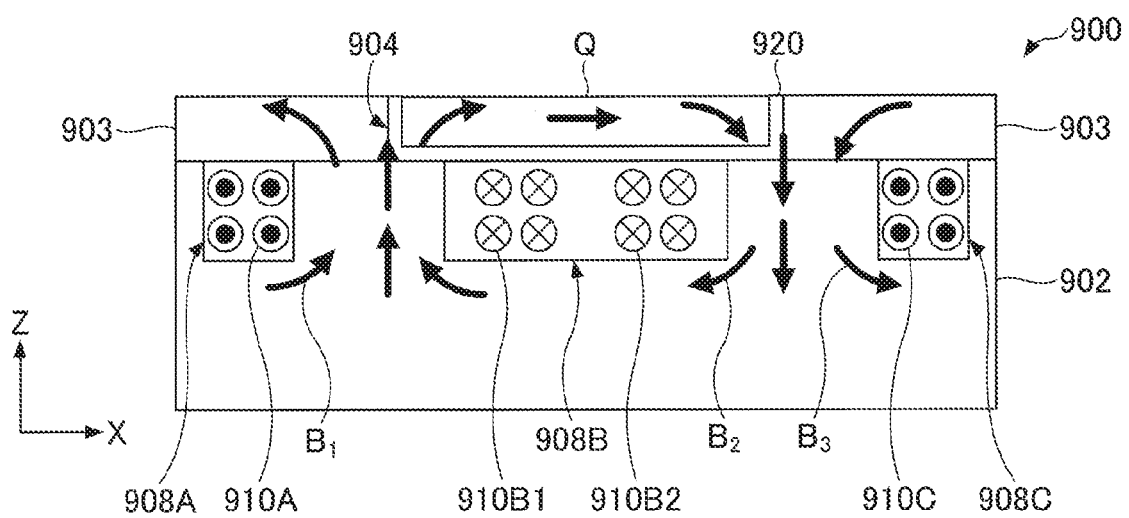
FIG. 10 is a cross-sectional view schematically illustrating a configuration example of another magnetization apparatus that can be used for magnetization process of an assembly.

FIG. 10 schematically illustrates a magnetization apparatus (second magnetization apparatus) that can be used in step S220 of the second manufacturing method.

As illustrated in FIG. 10, a second magnetization apparatus 900 has a housing 902. The housing 902 has a non-magnetic frame member 903 in the upper part, and an accommodation part 904 is formed in the upper part of the housing 902 by the frame member 903. A magnetization target body, i.e., an assembly holding case 920 including an assembly, is placed in the accommodation part 904.

Immediately below the frame member 903 and the accommodation part 904, Coil accommodation spaces 908A, 908B, and 908C are formed in parallel with each other along a top view, i.e., the Y direction (i.e., a direction perpendicular to the page of this application) of FIG. 10.

Coils 910A and 910C are accommodated in the coil accommodation spaces 908A and 908C, respectively. On the other hand, two pairs of coils, i.e., a coil 910B1 (upper and lower four coils on the left-hand side) and a coil 910B2 (upper and lower four coils on the right-hand side) are accommodated in the central coil accommodation space 908B.

It should be noted that the space between the coil 910B1 and the coil 910B2 is an air layer, in which the relative permeability is low, and accordingly, it is difficult for magnetic flux to pass through this space. Note that, in practice, the gap of the coil accommodation space 908B can be filled with non-magnetic resin. The same applies to the coil accommodation spaces 908A and 908C.

In a case where an assembly is magnetized using the magnetization apparatus 900, an assembly holding case 920 is arranged in the accommodation part 904 of the housing 902. In the assembly holding case 920, a magnetization target body Q is placed. The magnetization target body Q may be, for example, the assembly 260 illustrated in FIG. 4 explained above.

It should be noted that the magnetization target body Q does not necessarily need to be accommodated in the assembly holding case 920. For example, the magnetization target body Q may be directly accommodated in the accommodation part 904 of the housing 902.

Next, in this state, a current is supplied to the coils 910A, 910B1 in the housing 902.

Here, as illustrated in FIG. 10, it is assumed that a current flows through the coils 910A and 910C from the back side to the front side of the page of this application, and a current flows through the coils 910B1 and 910B2 from the front side to the back side of the page of this application. The housing 902 is made of a magnetic material and functions as a yoke.

With the applied current, an annular magnetic field $B_1$ is generated from the coil 910A. As illustrated in FIG. 10, the annular magnetic field $B_1$ is generated substantially in a counterclockwise direction around the coil 910A. Likewise, with the applied current, the annular magnetic field $B_2$ is generated from the coils 910B1, B2. As illustrated in FIG. 10, the annular magnetic field $B_2$ is generated substantially in a clockwise direction around the two coils 910B1, 910B2. Likewise, with the applied current, the annular magnetic field $B_3$ is generated from the coil 910C. As illustrated in FIG. 10, the annular magnetic field $B_3$ is generated substantially in a counterclockwise direction around the coil 910C.

Here, the coils 910A, 910B1, 910B2, and the coil 910C are energized by generating a pulse current using a capacitor with a high charge capacitance as explained above. In other words, the annular magnetic fields $B_1$ to $B_3$ are pulse magnetic fields.

In such methods, strong annular magnetic fields $B_1$ to $B_3$ can be stably generated from the coils 910A, 910B1, 910B2, and 910C without damaging the coils 910A, 910B1, 910B2, and 910C.

As explained above, the pulse width of the pulse current is, for example, in the range of 0.3 ms to 100 ms, preferably 0.5 ms to 10 ms. The maximum current is, for example, in the range of 8 kA to 20 kA. It should be noted that the pulse current may be applied to the coils 910A, 910B1, 910B2, and 910C a plurality of times.

A pulse magnetic field is applied to the magnetization target body Q by these annular magnetic fields $B_1$ to $B_3$. As a result, the unmagnetized magnet materials contained in the magnetization target body Q are magnetized, and thus a magnetized body is obtained.

Figure 11:
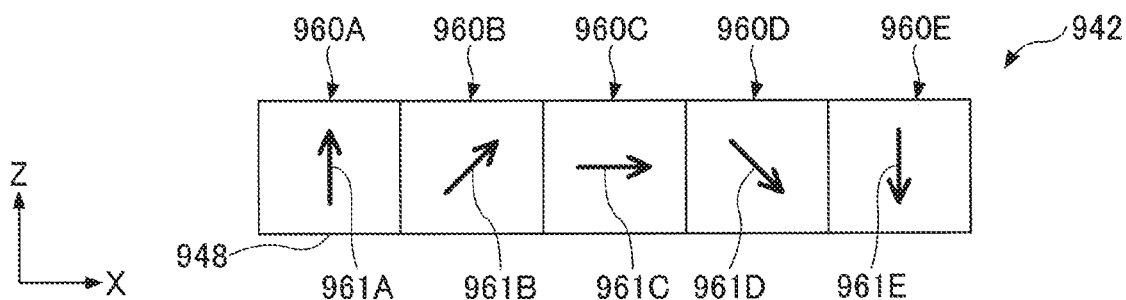
FIG. 11 is a drawing schematically illustrating an example of magnetizing directions of a magnetized body obtained through magnetizing process using the magnetization apparatus illustrated in FIG. 10.

For example, in a case where the magnetization process is performed on the assembly 260 as illustrated in FIG. 4, the unmagnetized magnet materials 210A to 210D are magnetized into magnets magnetized in the magnetizing directions as illustrated in FIG. 11.

Here, as illustrated in FIG. 11, in a magnetized body 942, the magnetized magnets will be referred to as a magnet block 960A, a magnet block 960B, a magnet block 960C, a magnet block 960D, and a magnet block 960E, in an order along the X direction. The magnetization directions of the magnet blocks 960A to 960E will be referred to as 961A to 961E.

In the magnetized body 942, an angle formed by the magnetizing directions of adjacent magnet block pairs, i.e., a magnetization direction angle difference θ, is 45 degrees in any of the pairs. As explained above, it should be noted that this magnetization direction angle difference θ includes a variation of about ±5 degrees.

In the magnetized body 942 illustrated in FIG. 11, the bottom face 948 is a face yielding the maximum surface magnetic flux density (i.e., a principal face of a Halbach magnet).

The size in the direction perpendicular to the principal face of the magnetized body 942 ("thickness" of the magnetized body 942) is, for example, in a range of 1 mm to 10 mm, more preferably in a range of 1 mm to 6 mm, still more preferably in a range of 1.5 mm to 4 mm. By setting the thickness to 1.5 mm or more, the maximum value of the surface magnetic flux density on the principal face of the magnetized body 942 can be increased. By setting the thickness to less than 4 mm, the magnetization rate of each of the magnets constituting the magnetized body 942 can be 95% or more. By setting the magnetization rate to 95% or more, the squareness is improved, and this can make it less likely for the magnet to demagnetize.

Further, unlike the magnetized body 742 illustrated in FIG. 8 explained above, the magnetized body 942 is configured such that the bottom face 948 has two magnetic poles (the magnet 960A and the magnet 960E).

Here, FIG. 11 illustrates, for example, a case where the magnetization direction angle difference θ is 45 degrees in the magnetized body 942. However, this is merely an example, and in the magnetized body, the magnetization direction angle difference θ can be any given value selected from a range of 30 degrees to 120 degrees.

For example, in the magnetization apparatus 900 illustrated in FIG. 10, in a case where the distance between the three coil accommodation spaces 908A, 908B, and 908C is brought to be closer, a magnetized body having a larger magnetization direction angle difference θ can be obtained. Conversely, in a case where the distance between the three coil accommodation spaces 908A, 908B, and 908C is brought to be farther, a magnetized body having a smaller magnetization direction angle difference θ can be obtained.

Through the above steps, a magnetized body 942, i.e., a Halbach magnet, can be manufactured.

It will be understood by those skilled in the art that this second manufacturing method can provide the same advantages as those of the first manufacturing method explained above.

The configuration and features of the present invention have been described above with reference to the first and second manufacturing methods as an example. However, the above explanation is merely an example, and it will be understood to those skilled in the art that each step can be modified or changed in the first and second manufacturing methods.

For example, by appropriately changing the configuration of the magnetization apparatus, for example, a magnetized body having a magnetization direction angle difference θ of about 30 degrees can be formed by magnetizing the assembly 460 as illustrated in FIG. 6.

At least a part of the method for manufacturing a Halbach magnet explained in the present application can also be applied as a magnetizing method for magnetizing an unmagnetized magnet.

EXAMPLES

Next, examples of the present invention will be explained.

Example 1

A Halbach magnets was manufactured by the following method.

First, three sintered neodymium magnets (manufactured by Neomag Co., Ltd.) were prepared in which the magnetization easy axes of magnetic particles were oriented in a single direction.

These magnets were demagnetized by being heated and then processed into the specified dimensions to obtain the first to third unmagnetized magnet materials.

The first unmagnetized magnet material was substantially in a cuboid shape, and had dimensions of 7 mm long×6.7 mm wide×2 mm high. In the first unmagnetized magnet material, the magnetization easy axis of the magnetic particles was oriented along the height direction (i.e., direction parallel to the side of 2 mm). The second unmagnetized magnet material had the same dimensions as the first unmagnetized magnet material. However, in the second unmagnetized magnet material, the magnetization easy axis of the magnetic particles was oriented along the horizontal direction (i.e., direction parallel to the side of 6.7 mm). The third unmagnetized magnet material was the same as the first unmagnetized magnet material.

Next, the unmagnetized magnet materials were arrayed in a row in an order of the first unmagnetized magnet material, the second unmagnetized magnet material, and the third unmagnetized magnet material, with the faces of 7 mm×2 mm being bonding target faces. In addition, the unmagnetized magnet materials were bonded via an epoxy resin to form an assembly.

In the assembly, the orientations of the magnetization easy axes in the unmagnetized magnet materials were as illustrated in FIG. 3 explained above.

Next, the assembly was magnetized using the second magnetization apparatus 900 as illustrated in FIG. 10. The capacitance of the capacitor used was 1000 µF, and the charging voltage was 1400V. As a result of a discharge of the electric charge charged in the capacitor, a pulse current of up to 14.1 kA having a pulse width of 0.7 ms or less was applied to the coils 910A to 910C. As a result, an annular pulse magnetic field was generated around the coils 910A to 910C, and the assembly was magnetized.

Figure 12:
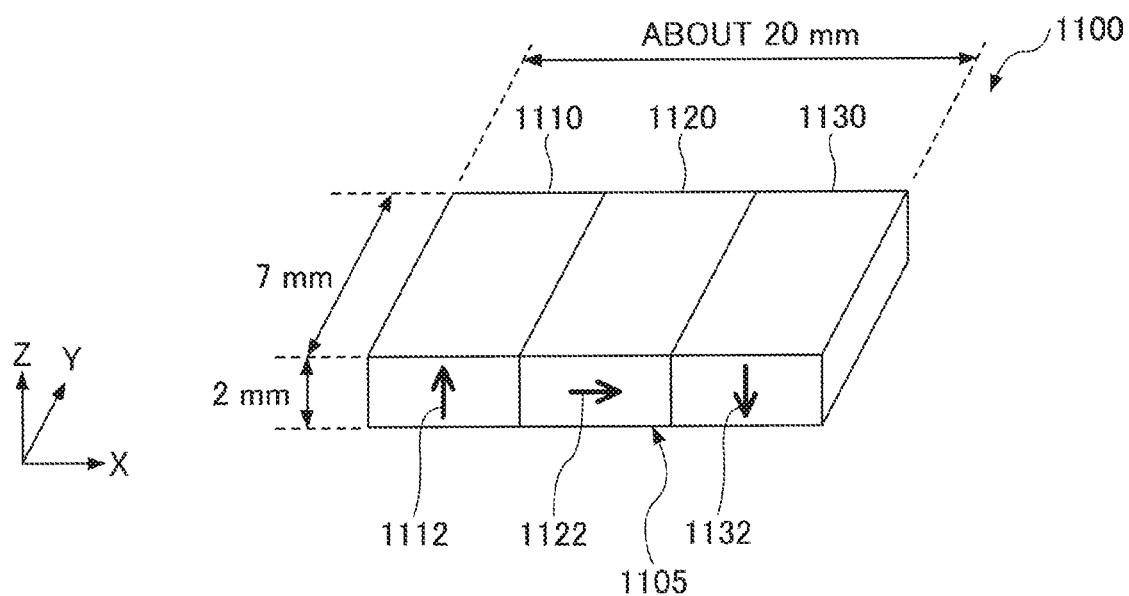
FIG. 12 is a perspective view schematically illustrating a form of a Halbach magnet obtained after the magnetization in Example 1.

FIG. 12 schematically illustrates a form of a Halbach magnet obtained after magnetization.

As illustrated in FIG. 12, a Halbach magnet 1100 includes three magnet blocks 1110, 1120, and 1130.

In the leftmost magnet block 1110, the magnetization direction was the positive direction of the Z axis. In the central magnet block 1120, the magnetization direction was the positive direction of the X axis. In the rightmost magnet block 1130, the magnetization direction was the negative direction of the Z axis. Therefore, the magnetization direction angle difference θ was 90 degrees (where 0 degrees ≤θ≤180 degrees holds).

In the Halbach magnet 1100, the bottom face 1105 had the strongest surface magnetic flux density, and therefore, the bottom face 1105 served as the principal face.

As described above, the Halbach magnet 1100 with two magnetic poles on the principal face was manufactured.

Example 2

A Halbach magnet was prepared in the same manner as in Example 1.

However, in Example 2, the dimensions of each unmagnetized magnet material were changed to 7 mm long×6.7 mm wide×3 mm high. The fabrication conditions other than the above are the same as those in Example 1.

Example 3

A Halbach magnet was made according to a method similar to Example 1.

However, in Example 3, the dimensions of each unmagnetized magnet material were changed to 7 mm long×6.7 mm wide×3.5 mm high. The fabrication conditions other than the above are the same as those in Example 1.

Example 4

A Halbach magnet was made according to a method similar to Example 1.

However, in Example 4, the dimensions of each unmagnetized magnet material were changed to 7 mm long×6.7 mm wide×6 mm high. The fabrication conditions other than the above are the same as those in Example 1.

Example 5

A Halbach magnet was made according to a method similar to Example 1.

However, in Example 5, five unmagnetized magnet materials were bonded to form an assembly. The dimensions of each unmagnetized magnet material were 15 mm long×4 mm wide×4 mm high.

In the assembly, the orientations of the magnetization easy axes in the unmagnetized magnet materials were as illustrated in FIG. 5 explained above.

Next, the assembly was magnetized using the second magnetization apparatus 700 as illustrated in FIG. 7. The capacitance of the capacitor used was 1000 µF, and the charging voltage was 1400V. As a result of a discharge of the electric charge charged in the capacitor, a pulse current of up to 14.1 kA having a pulse width of 0.7 ms or less was applied to the coils 710A to 710C. As a result, an annular pulse magnetic field was generated around the coils 710A to 710B, and the assembly was magnetized.

After the magnetization, a Halbach magnet having magnetization directions as illustrated in FIG. 8 explained above was manufactured.

Example 6

A Halbach magnet was made according to a method similar to Example 5.

However, in Example 6, in the assembly, the orientations of the magnetization easy axes in the unmagnetized magnet materials were as illustrated in FIG. 4.

Figure 13:
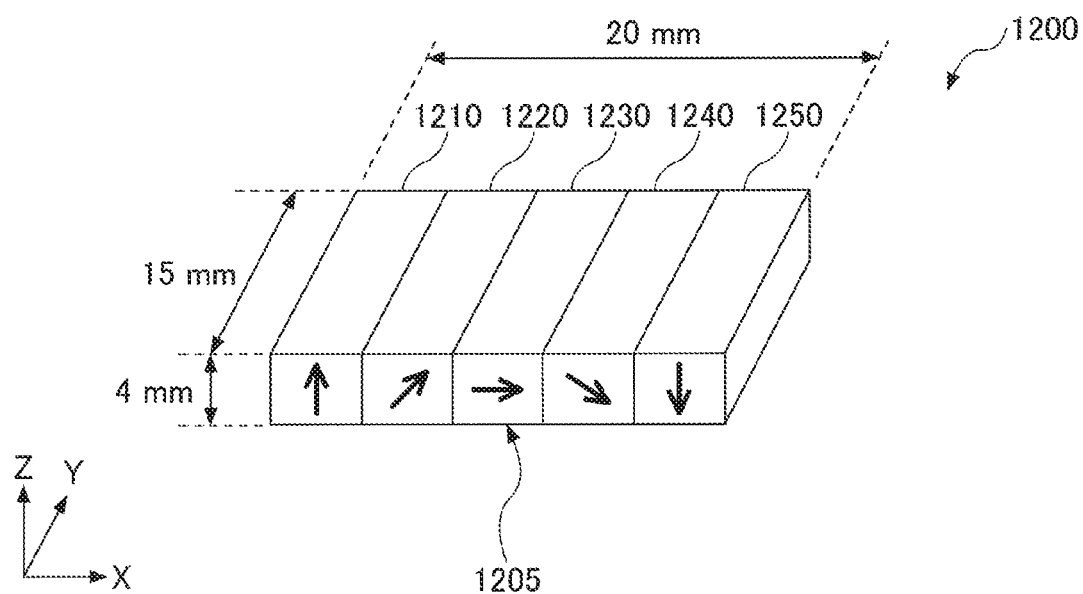
FIG. 13 is a perspective view schematically illustrating a form of a Halbach magnet obtained after the magnetization in Example 6.

As a result of performing the magnetization process on the assembly using the second magnetization apparatus 900, a Halbach magnet as illustrated in FIG. 13 was obtained.

As illustrated in FIG. 13, this Halbach magnet 1200 includes five magnet blocks 1210, 1220, 1230, 1240, and 1250.

In the leftmost magnet block 1210, the magnetization direction was the positive direction of the Z axis. Then, the magnetization direction of each of the magnet blocks was changed 45 degrees in the clockwise direction along the array direction. In the rightmost magnet block 1250, the magnetization direction was the negative direction of the Z axis. Therefore, in this Halbach magnet 1200, the magnetization direction angle difference θ was 45 degrees (however, 0 degrees ≤θ≤180 degrees holds).

In the Halbach magnet 1200, the bottom face 1205 had the strongest surface magnetic flux density, and therefore, the bottom face 1205 served as the principal face.

As described above, in Example 6, the Halbach magnet 1200 with two magnetic poles on the principal face was manufactured.

Example 7

A Halbach magnet was made according to a method similar to Example 1.

However, in Example 7, the first and third unmagnetized magnet materials were 7 mm long×8.0 mm wide×4 mm high, and the second unmagnetized magnet material was 7 mm long×4.0 mm wide×4 mm high. In other words, the ratio of the lengths in the width direction (horizontal direction)

between the magnet pieces is 2:1:2. The fabrication conditions other than the above are the same as those in Example 1.

Example 8

A Halbach magnet was made according to a method similar to Example 1.

In Example 8, however, the first and third unmagnetized magnet materials were 7 mm long×8.0 mm wide×6 mm high, and the second unmagnetized magnet material was 7 mm long×4.0 mm wide×6 mm high. In other words, the ratio of the lengths in the width direction (horizontal direction) between the magnet pieces is 2:1:2. The fabrication conditions other than the above are the same as those in Example 1.

Example 9

A Halbach magnet was made according to a method similar to Example 1.

In Example 9, however, the first and third unmagnetized magnet materials were 7 mm long×5.0 mm wide×4 mm high, and the second unmagnetized magnet material was 7 mm long×10.0 mm wide×4 mm high. In other words, the ratio of the lengths in the width direction (horizontal direction) between the magnet pieces is 1:2:1. The fabrication conditions other than the above are the same as those in Example 1.

Example 10

A Halbach magnet was made according to a method similar to Example 1.

In Example 10, however, the first and third unmagnetized magnet materials were 7 mm long×5.0 mm wide×6 mm high, and the second unmagnetized magnet material was 7 mm long×10.0 mm wide×6 mm high. In other words, the ratio of the lengths in the width direction (horizontal direction) between the magnet pieces is 1:2:1. The fabrication conditions other than the above are the same as those in Example 1.

Example 11

A Halbach magnet was made according to a method similar to Example 1.

In Example 11, however, the first and third unmagnetized magnet materials were 7 mm long×5.0 mm wide×8 mm high, and the second unmagnetized magnet material was 7 mm long×10.0 mm wide×8 mm high. In other words, the ratio of the lengths in the width direction (horizontal direction) between the magnet pieces is 1:2:1. The fabrication conditions other than the above are the same as those in Example 1.

Example 12

A Halbach magnet was made according to a method similar to Example 1.

In Example 12, however, the first and third unmagnetized magnet materials were 7 mm long×5.0 mm wide×10 mm high, and the second unmagnetized magnet material was 7 mm long×10.0 mm wide×10 mm high. In other words, the ratio of the lengths in the width direction (horizontal direction) between the magnet pieces is 1:2:1. The fabrication conditions other than the above are the same as those in Example 1.

Example 21

A Halbach magnet was made according to a method similar to Example 1.

However, in Example 21, the dimensions of each unmagnetized magnet material were changed to 7 mm long×6.7 mm wide×8 mm high. The fabrication conditions other than the above are the same as those in Example 1.

Example 22

A Halbach magnet was made according to a method similar to Example 1.

In Example 22, however, the first and third unmagnetized magnet materials were 7 mm long×8.0 mm wide×8 mm high, and the second unmagnetized magnet material was 7 mm long×4.0 mm wide×8 mm high. In other words, the ratio of the lengths in the width direction (horizontal direction) between the magnet pieces is 2:1:2. The fabrication conditions other than the above are the same as those in Example 1.

Example 23

A Halbach magnet was made according to a method similar to Example 1.

In Example 23, however, the first and third unmagnetized magnet materials were 7 mm long×8.0 mm wide×10 mm high, and the second unmagnetized magnet material was 7 mm long×4.0 mm wide×10 mm high. In other words, the ratio of the lengths in the width direction (horizontal direction) between the magnet pieces is 2:1:2. The fabrication conditions other than the above are the same as those in Example 1.

(Evaluation)

In the Halbach magnets manufactured in Examples, the adhesives were removed, and the magnet blocks were separated. Also, the magnetization rates were evaluated using the obtained magnet blocks (hereinafter referred to as "separated magnets").

The magnetization rates of the separated magnets were measured according to the following method using a Helmholtz coil device.

Figure 14:
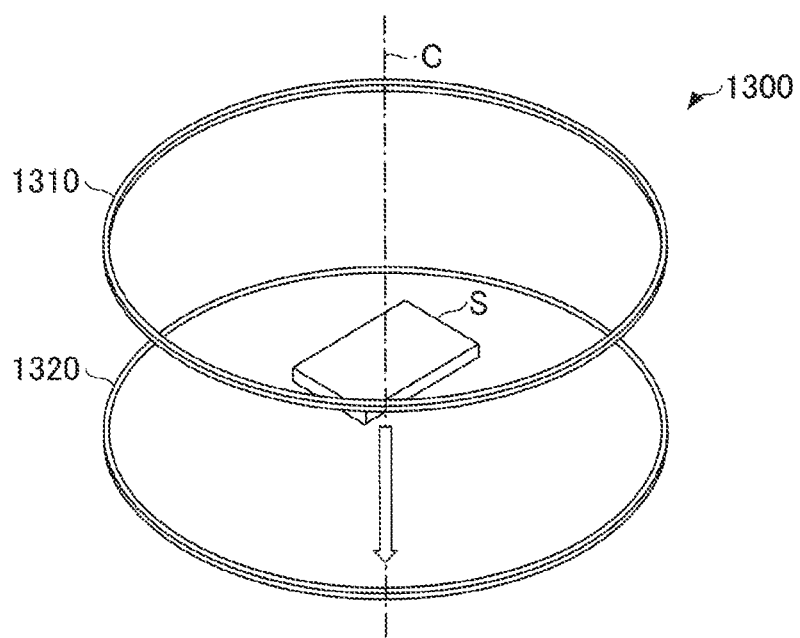
FIG. 14 is a drawing schematically illustrating a configuration of a Helmholtz coil device.

FIG. 14 schematically illustrates a configuration of a Helmholtz coil device.

As illustrated in FIG. 14, a Helmholtz coil device 1300 includes a first coil 1310 at an upper side and a second coil 1320 at a lower side. The first coil 1310 and the second coil 1320 are arranged in parallel to each other so as to have the same central axis C.

The diameters of the first coil 1310 and the second coil 1320 are both 70 mm, and the number of turns of the first coil 1310 and the second coil 1320 are both 50 times. A distance d between the coils 1310 and 1320 is 35 mm.

At the time of measurement, a measurement target body (separated magnet) S is disposed at an intermediate position between the first coil 1310 and the second coil 1320 on the central axis C of the first coil 1310 and the second coil 1320. Also, the orientation directions of the magnetization easy axes of the measurement target body are arranged to be in parallel to the central axis C.

In this state, the measurement target body S is moved along the central axis C in the direction indicated by the arrow and pulled out across the plane formed by the second coil 1320. With this action, an induced voltage V is generated in the first coil 1310 and the second coil 1320.

Figure 15:
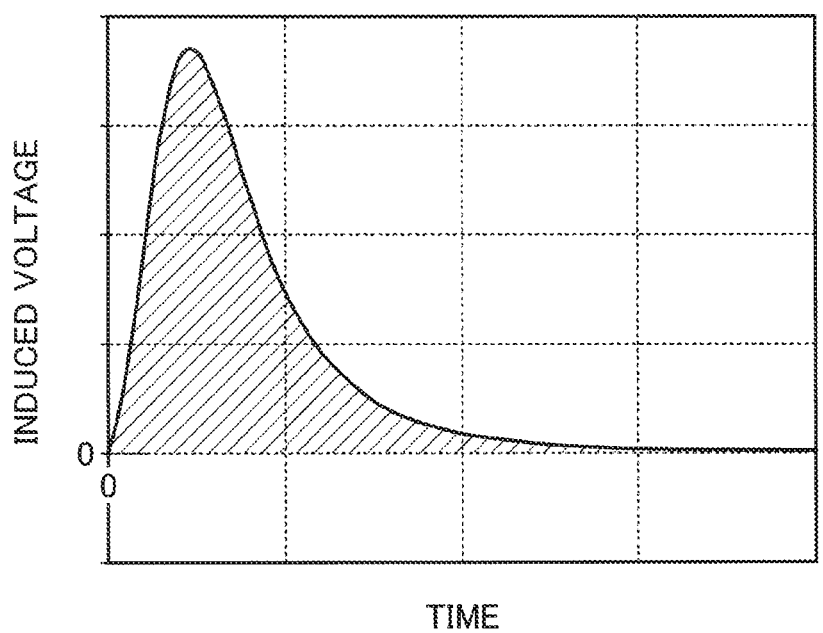
FIG. 15 is a graph illustrating an example of a relationship between a moving distance of a sample and an induced voltage V obtained in the Helmholtz coil device.

FIG. 15 schematically illustrates an induced voltage V generated in the first coil 1310 and the second coil 1320 by the pull-out action of the measurement target body S. In FIG. 15, the horizontal axis denotes a time change when the measurement target body S is pulled out, and the vertical axis denotes the induced voltage V.

From an area bounded by the curve of the induced voltage V and the horizontal axis (shaded portion in FIG. 15), the total magnetic flux amount $R_1$ of the measurement target body S is measured.

Next, a sufficient external magnetic field is applied to the measurement target body S along the orientation direction of the magnetization easy axis of the measurement target body S to completely magnetize the measurement target body S (full magnetization). In the present application, an external magnetic field of 7 T was applied. Using this fully magnetized measurement target body S, an induced voltage V is similarly measured to derive the total magnetic flux amount $R_2$ in the fully magnetized state. From the obtained results, the following equation (1) is used to obtain the magnetization rate R.

Magnetization ratio $R(\%)=(R_1/R_2)\times 100$   Expression (1)

In the present application, the total magnetic flux amount $R_1$ and the total magnetic flux amount $R_2$ are each the average of three measurement results.

Table 1 below summarizes the measurement results of the magnetization rates R of the separated magnets taken from the Halbach magnets manufactured in Examples.

tured properly even if the magnetization directions are greatly different between adjacent magnet blocks such that the magnetization direction angle difference θ exceeds 45 degrees.

The magnetization rate has a great influence not only on the strength of the magnetic force but also on the squareness that represents the resistance to demagnetization. When the magnetization rate is less than 95%, the squareness is greatly reduced. Therefore, it is preferable that the magnetization rates of all the magnet blocks forming the Halbach magnet exceed 95%.

In addition, the ease of magnetization is greatly influenced not only by the thickness of the magnet, but also by the ratio of the lengths in the width direction of the unmagnetized magnet materials (for example, the sizes in the X direction in FIG. 12, FIG. 13, and the like).

More specifically, a ratio (W1:W2) between a length W1 in the width direction of a magnet block having a magnetization easy axis oriented in a direction perpendicular to a face yielding a maximum surface magnetic flux density and a length W2 in the width direction of a magnet block having a magnetization easy axis oriented in a direction parallel to the face yielding the maximum surface magnetic flux density is preferably in a range of 1:2 to 2:1.

This is because, when the length W1 in the width direction of a magnet block having a magnetization easy axis oriented in a direction perpendicular to a face yielding a maximum surface magnetic flux density is too high, a surface magnetic flux density on a face opposite to the face yielding the maximum surface magnetic flux density increases, and as a result, a problem of leakage of a magnetic flux occurs. Also,

TABLE 1

| EXAMPLE | THICKNESS OF MAGNET (mm) | RATIO OF LENGTHS IN WIDTH DIRECTION | MAGNETIZATION DIRECTION ANGLE DIFFERENCE BETWEEN ADJACENT MAGNET BLOCKS (°) | MAGNETIZATION RATE R (%) | | | | | |
|---|---|---|---|---|---|---|---|---|---|
| | | | | SEPARATED MAGNET 1 | SEPARATED MAGNET 2 | SEPARATED MAGNET 3 | SEPARATED MAGNET 4 | SEPARATED MAGNET 5 | AVERAGE |
| 1 | 2 | 1:1:1 | 90 | 96 | 99 | 96 | — | — | 97 |
| 2 | 3 | 1:1:1 | 90 | 95 | 100 | 98 | — | — | 97 |
| 3 | 3.5 | 1:1:1 | 90 | 98 | 100 | 95 | — | — | 97 |
| 4 | 6 | 1:1:1 | 90 | 92 | 100 | 95 | — | — | 96 |
| 5 | 4 | 1:1:1:1:1 | 45 | 97 | 99 | 100 | 100 | 97 | 98 |
| 6 | 4 | 1:1:1:1:1 | 45 | 98 | 96 | 94 | 99 | 99 | 97 |
| 7 | 4 | 2:1:2 | 90 | 100 | 100 | 100 | — | — | 100 |
| 8 | 6 | 2:1:2 | 90 | 84 | 99 | 88 | — | — | 90 |
| 9 | 4 | 1:2:1 | 90 | 99 | 100 | 100 | — | — | 100 |
| 10 | 6 | 1:2:1 | 90 | 97 | 100 | 97 | — | — | 98 |
| 11 | 8 | 1:2:1 | 90 | 92 | 98 | 98 | — | — | 96 |
| 12 | 10 | 1:2:1 | 90 | 91 | 97 | 91 | — | — | 93 |
| 21 | 8 | 1:1:1 | 90 | 90 | 98 | 78 | — | — | 89 |
| 22 | 8 | 2:1:2 | 90 | 82 | 100 | 86 | — | — | 89 |
| 23 | 10 | 2:1:2 | 90 | 78 | 99 | 80 | — | — | 86 |

In Examples, a field of "average" indicates an average value of the magnetization rates R obtained from the separated magnets retrieved from a Halbach magnet.

From the results in Table 1, it can be seen that in Example 1 to Example 12, high magnetization rates were obtained from the separated magnets in any Example. In particular, in Example 5, Example 7, and Example 9 to Example 10, the average magnetization rates R of the separated magnets were over 98%, which is extremely high.

As described above, it was confirmed that, in a case where the method according to an embodiment of the present invention is applied, the Halbach magnets can be manufacthis is because, when the length W2 in the width direction of a magnet block having a magnetization easy axis oriented in a direction parallel to a face yielding a maximum surface magnetic flux density is too high, there occurs a problem in that the maximum magnetic flux density decreases on the face yielding the maximum surface magnetic flux density.

For example, in a case where the thickness of a Halbach magnet is more than 6 mm (for example, up to 10 mm), a length W2 in the width direction of a magnet block having a magnetization easy axis oriented in a direction parallel to the face yielding the maximum surface magnetic flux density with respect to a length W1 in the width direction of a magnet block having a magnetization easy axis oriented in a direction perpendicular to a face yielding a maximum surface magnetic flux density, i.e., W2/W1, may be in a range of more than 1 and equal to or less than 2.

For example, in a case where the thickness of a Halbach magnet is equal to or less than 6 mm, a ratio (W1:W2) between a length W1 in the width direction of a magnet block having a magnetization easy axis oriented in a direction perpendicular to a face yielding a maximum surface magnetic flux density and a length W2 in the width direction of a magnet block having a magnetization easy axis oriented in a direction parallel to the face yielding the maximum surface magnetic flux density may be in a range of 2:1 to 1:1.

In this case, with the magnet blocks, a high magnetization rate R exceeding 95% and an average magnetization rate of 98% or more can be obtained.

For example, in a case of Example 10, the ratio between the length W1 in the width direction of the leftmost magnet block and the length W2 in the width direction of the center magnet block is 1:2. In this case, a significantly higher magnetization rate can be obtained as compared to the case where the ratio W1:W2 is 1:1 as in Example 4.

The present application claims priority based on Japanese Patent Application No. 2017-104929 filed on May 26, 2017, the entire contents of which are incorporated herein by reference.

REFERENCE SIGNS LIST 110 unmagnetized magnet material
110A first unmagnetized magnet material
110B second unmagnetized magnet material
112A first upper face
112B second upper face
114A first bottom face
114B second bottom face
116A first side face
116B second side face
140, 140A, 140B magnetization easy axis
160 assembly
162 upper face
164 bottom face
166 side face
210A to 210D unmagnetized magnet material
240A to 240D magnetization easy axis
260 assembly
310A to 310D unmagnetized magnet material
340A to 340D magnetization easy axis
360 assembly
410A to 410F unmagnetized magnet material
440A to 440F magnetization easy axis
460 assembly
700 magnetization apparatus
702 housing
704 accommodation part
708A, 708B coil accommodation space
710A, 710B coil
720 assembly holding case
742 magnetized body
748 bottom face
760A to 760E magnet block
761A to 761E magnetization direction
842 magnetized body
848 bottom face
900 second magnetization apparatus
902 housing
903 frame member
904 accommodation part
908A to 908C coil accommodation space
910A, 910B1, 910B2, 910C coil
920 assembly holding case
942 magnetized body
948 bottom face
960A to 960E magnet block
961A to 961E magnetization direction
1100 Halbach magnet
1105 bottom face
1110 to 1130 magnet block
1200 Halbach magnet
1205 bottom face
1210 to 1250 magnet block
1300 Helmholtz coil device
1310 first coil
1320 second coil
Q magnetization target body
S measurement target body

What is claimed is:
1. A method for manufacturing a magnet, comprising:
(1) a step of preparing three or more unmagnetized magnet materials of which magnetization easy axes are oriented in predetermined directions, and adhering the unmagnetized magnet materials with each other to make an assembly; and
(2) a step of applying a curved pulse magnetic field to the assembly to magnetize the assembly, wherein in the step (2), the unmagnetized magnet materials are magnetized into magnet blocks, and an angle θ, where $0 \leq \theta \leq 180$ degrees holds, formed by magnetization directions of at least a pair of magnet blocks adjacent to each other is in a range of 30 degrees to 120 degrees, and wherein where a direction in which the unmagnetized magnet materials are arrayed is referred to as a width direction, a magnet obtained from the step (2) has a ratio W1:W2 in a range of 1:2 to 2:1, W1 being a length in the width direction of a magnet block having a magnetization easy axis oriented in a direction perpendicular to a face yielding a maximum surface magnetic flux density, and W2 being a length in the width direction of a magnet block having a magnetization easy axis oriented in a direction parallel to the face yielding the maximum surface magnetic flux density.

2. The method according to claim 1, wherein the angle θ is in a range of 45 degrees to 90 degrees.

3. The manufacturing method according to claim 1, wherein each unmagnetized magnet material is in a substantially rectangular parallelepiped shape.

4. The method according to claim 1, wherein in the step (1), the unmagnetized magnet materials are arrayed linearly.

5. The method according to claim 4, wherein the angle θ, where $0 \leq \theta \leq 180$ degrees holds, formed by magnetization directions of magnet blocks at both ends of three consecutive and adjacent magnet blocks including at least the pair of magnet blocks is in a range of 90 degrees to 180 degrees.

6. The method according to claim 1, wherein where the direction in which the unmagnetized magnet materials are arrayed is referred to as the width direction, the magnet obtained from the step (2) has a ratio of W2 with respect to W1 in a range of more than 1 and equal to or less than 2, W1 being the length in the width direction of the magnet block having the magnetization easy axis oriented in the direction perpendicular to the face yielding the maximum surface magnetic flux density, and W2 being the length in the width direction of the magnet block having the magnetization easy axis oriented in the direction parallel to the face yielding the maximum surface magnetic flux density, and a size of the magnet obtained from the step (2) in a direction perpendicular to the face yielding the maximum surface magnetic flux density is equal to or less than 10 mm.

7. The method according to claim 1, wherein where the direction in which the unmagnetized magnet materials are arrayed is referred to as the width direction, the magnet obtained from the step (2) has a ratio W1:W2 in a range of 2:1 to 1:1, W1 being the length in the width direction of the magnet block having the magnetization easy axis oriented in the direction perpendicular to the face yielding the maximum surface magnetic flux density, and W2 being the length in the width direction of the magnet block having the magnetization easy axis oriented in the direction parallel to the face yielding the maximum surface magnetic flux density, and a size of the magnet obtained from the step (2) in a direction perpendicular to the face yielding the maximum surface magnetic flux density is equal to or less than 6 mm.

8. The method according to claim 1, wherein the magnet has at least two magnetic poles on the face yielding the maximum surface magnetic flux density.

* * * * *